United States Patent
Shimada (10) Patent No.: US 12,149,187 B2
(45) Date of Patent: Nov. 19, 2024

(54) VIBRATION WAVE MOTOR AND IMAGING APPARATUS AND ELECTRONIC APPARATUS INCLUDING VIBRATION WAVE MOTOR

(71) Applicant: CANON KABUSHIKI KAISHA, Tokyo (JP)

(72) Inventor: Akira Shimada, Saitama (JP)

(73) Assignee: Canon Kabushiki Kaisha, Tokyo (JP)

(*) Notice: Subject to any disclaimer, the term of this patent is extended or adjusted under 35 U.S.C. 154(b) by 229 days.

(21) Appl. No.: 18/045,271

(22) Filed: Oct. 10, 2022

(65) Prior Publication Data
US 2023/0060963 A1 Mar. 2, 2023

Related U.S. Application Data

(63) Continuation of application No. PCT/JP2021/012482, filed on Mar. 25, 2021.

(30) Foreign Application Priority Data

Apr. 13, 2020 (JP) ................. 2020-071690

(51) Int. Cl.
*H02N 2/16* (2006.01)
*H02N 2/02* (2006.01)
*H02N 2/14* (2006.01)

(52) U.S. Cl.
CPC ............. *H02N 2/163* (2013.01); *H02N 2/026* (2013.01); *H02N 2/142* (2013.01)

(58) Field of Classification Search
CPC ........ H02N 2/163; H02N 2/026; H02N 2/142; H02N 2/0015; H02N 2/0065
See application file for complete search history.

(56) References Cited

U.S. PATENT DOCUMENTS

2009/0015099 A1* 1/2009 Mukae ................... H02N 2/026
310/323.01

FOREIGN PATENT DOCUMENTS

| JP | 2011200051 A | 10/2011 |
|---|---|---|
| JP | 2011234608 A | 11/2011 |
| JP | 2012115038 A | 6/2012 |
| JP | 2015106927 A | 6/2015 |
| JP | 5930595 B2 | 6/2016 |
| JP | 2019033627 A | 2/2019 |
| JP | 2019187093 A | 10/2019 |

* cited by examiner

*Primary Examiner* — Emily P Pham
(74) *Attorney, Agent, or Firm* — Canon U.S.A., Inc. IP Division (57) ABSTRACT

A vibration wave motor, includes a vibrator including an electro-mechanical energy conversion element and an elastic body, and a contact body, wherein the elastic body includes a flat plate portion on which the electro-mechanical energy conversion element is fixed, and a protruding portion, wherein the protruding portion includes a contact portion, a side wall portion, and a coupling portion that is configured to couple the contact portion and the side wall portion, and wherein a predetermined inequality is satisfied, where a thickness of the side wall portion in a direction orthogonal to the pressure direction is t1, and a distance in the pressure direction from a second surface of the flat plate portion to the coupling portion is h1, the second surface of the flat plate portion facing a first surface of the flat plate portion on which the electro-mechanical energy conversion element is fixed.

11 Claims, 11 Drawing Sheets

MODE A

MODE B

MODE C

VIBRATION WAVE MOTOR AND IMAGING APPARATUS AND ELECTRONIC APPARATUS INCLUDING VIBRATION WAVE MOTOR

CROSS-REFERENCE TO RELATED APPLICATIONS

This application is a Continuation of International Patent Application No. PCT/JP2021/012482, filed Mar. 25, 2021, which claims the benefit of Japanese Patent Application No. 2020-071690, filed Apr. 13, 2020, both of which are hereby incorporated by reference herein in their entirety.

BACKGROUND OF THE INVENTION

Field of the Invention

The present invention relates to a vibration wave motor and an imaging apparatus and an electronic apparatus including the vibration wave motor.

Background Art

Vibration wave motors using an electro-mechanical energy conversion element as a vibration generation source include a vibration wave motor discussed in Patent Literature 1 (PTL1). The vibration wave motor discussed in PTL 1 includes a vibrator and a contact body. In the vibration wave motor, two protruding portions are disposed on a surface of a plate-like elastic body, and a piezoelectric element is fixed to a back surface of the elastic body. The contact body is in pressure contact with the protruding portions.

The vibration wave motor applies a predetermined alternating voltage to the electro-mechanical energy conversion element. Accordingly, two bending vibrations (standing waves) are excited, and within a plane including a direction in which the two protruding portions are connected to each other and a direction in which the protruding portions protrude, elliptic motion or circular motion is generated at leading ends of the protruding portions (each including a contact surface in pressure contact with the contact body). The contact body that is in pressure contact with the protruding portions receives frictional drive force (thrust force) from the two protruding portions, whereby the vibrator and the contact body can be relatively moved in the direction in which the two protruding portions are connected to each other.

CITATION LIST

Patent Literature

PTL 1: Japanese Patent No. 5930595

The above-described vibration wave motor increases amplitude in the direction in which the protruding portions are connected to each other (direction in which the vibrator and the contact body are relatively moved) in proportion to a distance from a neutral plane of a bending vibration (plane on which neither tension nor compression is generated by the bending vibration). In other words, the amplitude of the leading ends of the protruding portions in the direction in which the vibrator and the contact body are relatively moved increases in proportion to heights of the protruding portions. Thus, velocity of relative movement of the vibrator and the contact body increases in proportion to the height of each protruding portion.

However, since thrust force received by the contact body from the vibrator becomes smaller as the heights of the protruding portions increase, it is necessary to increase an applied voltage to increase the thrust force, in a case of driving a heavier contact body. Consequently, there arises an issue about, for example, an increase in power consumption and an increase in circuit cost, due to increase in the applied voltage.

The present disclosure has been made in consideration of the above-described issue and is directed to providing a vibration wave motor capable of increasing thrust force while preventing increase in applied voltage, and an electronic apparatus including the vibration wave motor.

SUMMARY OF THE INVENTION

According to an aspect of the present invention, a vibration wave motor, includes a vibrator including an electro-mechanical energy conversion element and an elastic body to which the electro-mechanical energy conversion element is fixed, and a contact body configured to be in pressure contact with the elastic body, wherein the vibration wave motor is configured to relatively move the vibrator and the contact body using a vibration excited in the vibrator, wherein the elastic body includes a flat plate portion on which the electro-mechanical energy conversion element is fixed, and a protruding portion that protrudes from the flat plate portion, wherein the protruding portion includes a contact portion that has a contact surface being in pressure contact with the contact body, a side wall portion that protrudes in a pressure direction and forms a hollow structure, the pressure direction representing a direction in which the contact surface is in pressure contact with the contact body, and a coupling portion that is configured to couple the contact portion and the side wall portion and has flexibility in the pressure direction, and wherein the following inequality is satisfied:

$$0 < h1/t1 \leq 2.0,$$

where a thickness of the side wall portion in a direction orthogonal to the pressure direction is t1, and a distance in the pressure direction from a second surface of the flat plate portion to the coupling portion is h1, the second surface of the flat plate portion facing a first surface of the flat plate portion on which the electro-mechanical energy conversion element is fixed.

Further features of the present invention will become apparent from the following description of exemplary embodiments with reference to the attached drawings.

DESCRIPTION OF THE EMBODIMENTS

Figure 1:
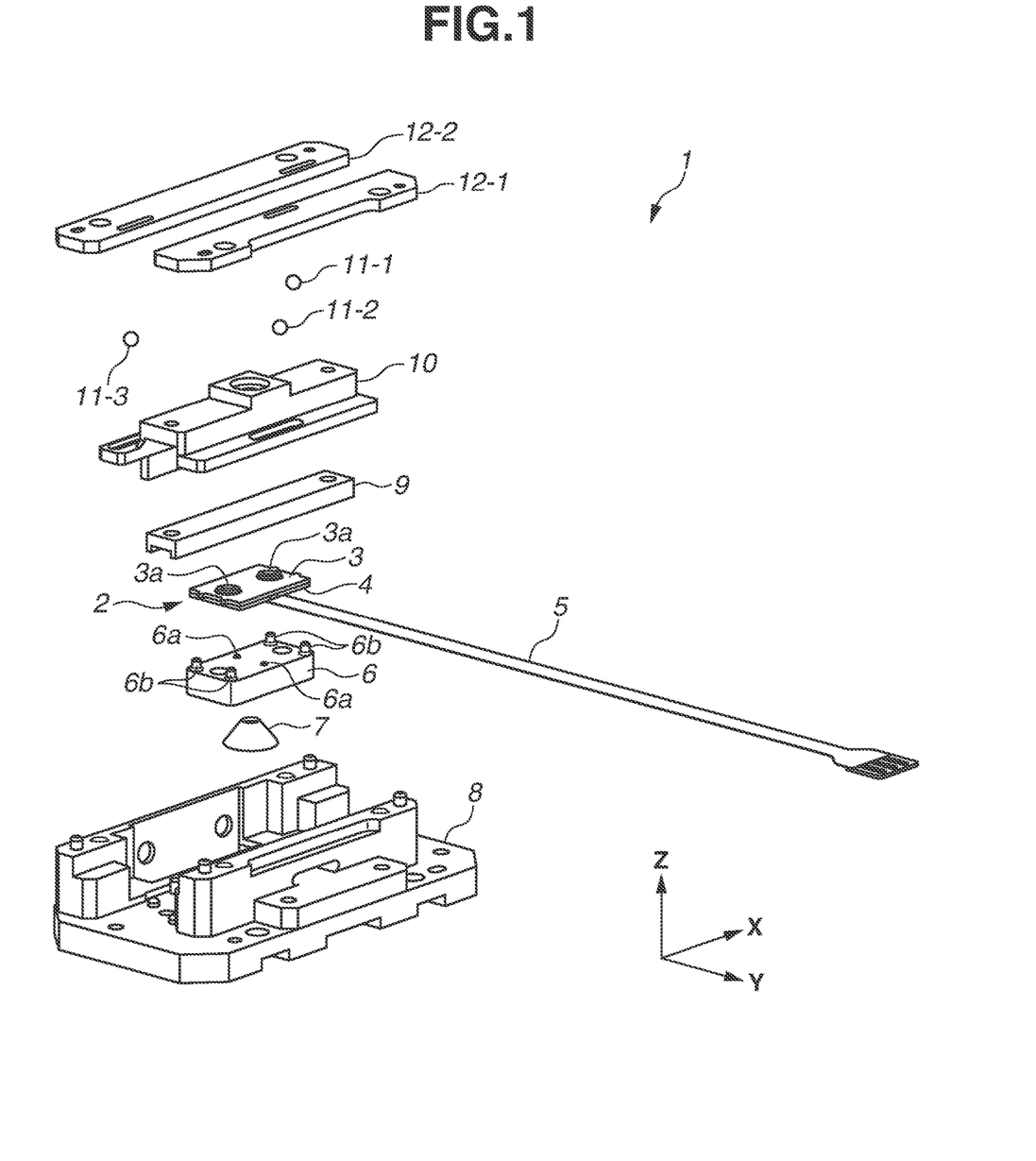
FIG. 1 is an exploded perspective view of a vibration wave motor according to a first exemplary embodiment of the present disclosure.
Figure 2:
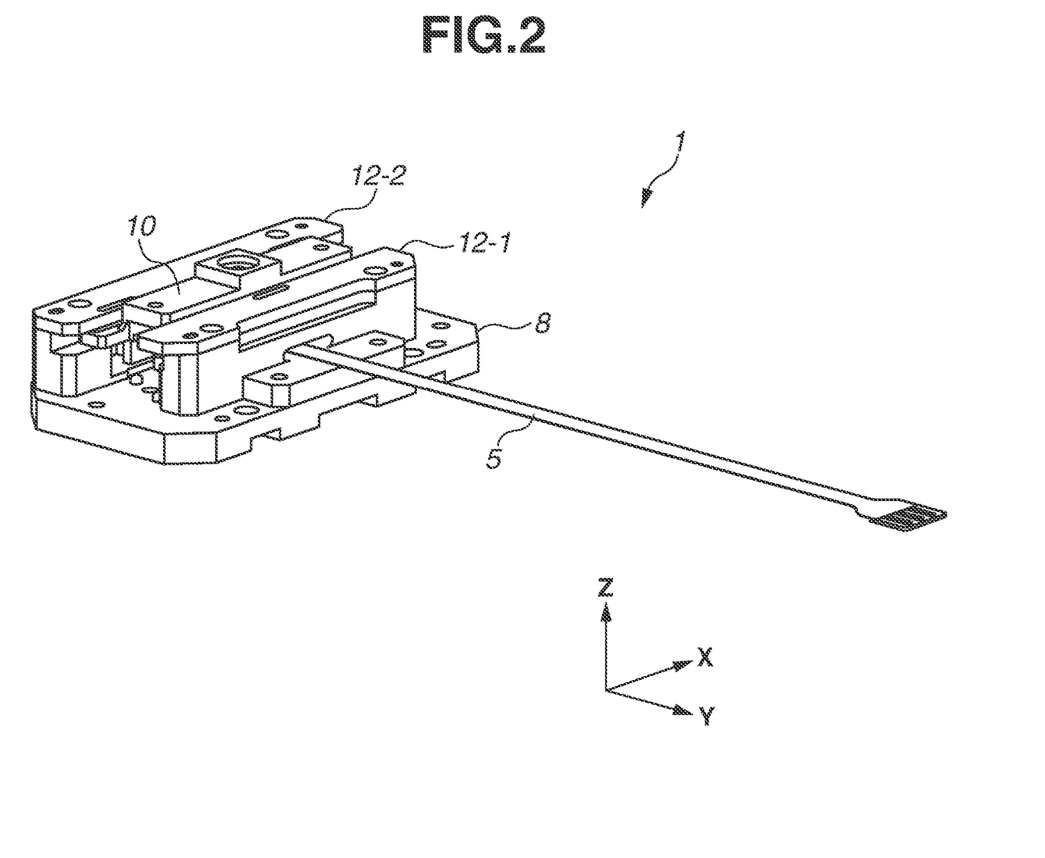
FIG. 2 is an assembly perspective view of the vibration wave motor according to the first exemplary embodiment of the present disclosure.

A first exemplary embodiment is an example in which the present disclosure is applied to a linear-type vibration wave motor, and details the vibration wave motor will be described with reference to FIGS. 1, 2, 3, 4A to 4C, and 5A to 5C. First, FIG. 1 is an exploded perspective view of a vibration wave motor 1 according to a first exemplary embodiment of the present disclosure. FIG. 2 is an assembly perspective view. A driving direction of a slider 9 serving as a contact body (direction in which a vibrator 2, which will be described below, and the slider 9 are relatively moved) is an "X-direction" (or simply referred to as "X"). A direction in which the slider 9 and the vibrator 2 are in pressure contact with each other (pressure direction) is a "Z-direction" (or simply referred to as "Z". A direction that is orthogonal to the X-direction and the Z-direction is defined as a "Y-direction" (or simply referred to as "Y").

A piezoelectric element 4, which is an electro-mechanical energy conversion element, is fixed to an elastic body 3 with an adhesive or the like, and a flexible print substrate 5 is fixed on a surface of the piezoelectric element 4 which is a surface opposite to the other surface on which the elastic body 3 is disposed. The elastic body 3, the piezoelectric element 4, and the flexible print substrate 5 constitute the vibrator 2. The flexible print substrate 5 is fixed to the piezoelectric element 4 with anisotropically conductive paste or an anisotropically conductive film that enables energization only in the Z-direction. Two protruding portions 3a that protrude from the elastic body 3 in a direction opposite to a side where the piezoelectric element 4 is fixed are formed on the elastic body 3.

Lead zirconate titanate is used for the piezoelectric element 4. Alternatively, the piezoelectric element 4 may be composed mostly of a piezoelectric material without containing lead, such as barium titanate and bismuth sodium titanate. An electrode pattern, which is not illustrated, is formed on each side of the piezoelectric element 4, and power is fed from the flexible print substrate 5 to the piezoelectric element 4 via the electrode pattern.

A pressure member 6 that applies pressure to and supports the vibrator 2 is disposed below the vibrator 2. Force of pressure is applied to the pressure member 6 by a pressure spring 7, and reaction force of the force of pressure is received by a base 8 serving as a pressure receiving member. A conical coil spring is adopted for the pressure spring 7 to downsize the vibration wave motor 1 in the Z-direction. A coil shape is illustrated in a simplified manner.

The slider 9 is disposed above the vibrator 2 and is in contact with the elastic body 3. The slider 9 is fixed to a slider holder 10, and is driven integrally with the slider holder 10 in the X-direction. Rubber can be disposed between the slider 9 and the slider holder 10 to attenuate a vibration. The slider 9 is composed of a metal having high abrasion resistance, ceramics, a resin or a composite material thereof. Especially, a material obtained by nitriding stainless steel, such as SUS420J2, is desirable in terms of abrasion resistance and mass production.

Three pairs of upper and lower rails formed on the slider holder 10 and ball rails 12-1 and 12-2 hold three balls 11-1, 11-2, and 11-3, and the ball rails 12-1 and 12-2 are fixed to the base 8. Thus, the slider 9 and the slider holder 10 can be moved with respect to the other components in the X-direction. An output transmitting portion in a desired shape is attached to the slider holder 10 to transmit output to the outside. While, in the present exemplary embodiment, the vibrator 2 is fixed and the slider 9 moves, it is also possible to fix the slider 9 and move the vibrator 2, in an opposite manner.

Figure 3:
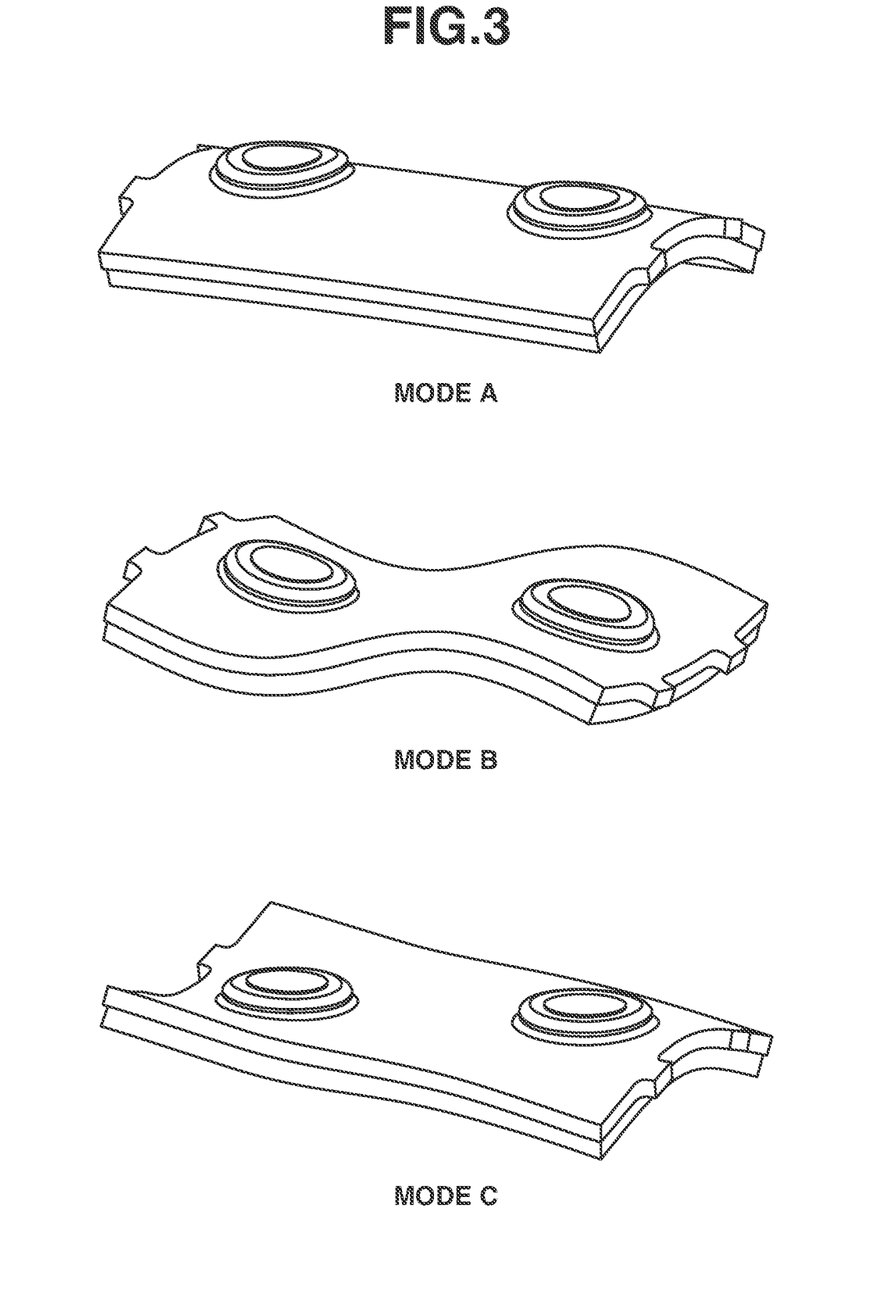
FIG. 3 is a perspective view for describing a vibration mode according to the first exemplary embodiment of the present disclosure.

A vibration mode in which a vibration is excited in the vibrator 2 is described with reference to FIG. 3. In the present exemplary embodiment, two alternating voltages having different phases are applied to the piezoelectric element 4 via the flexible print substrate 5, two different out-of-plane bending vibrations are excited in the vibrator 2, and a vibration that is a combination of the two different vibrations is generated.

A mode A, which is a first vibration mode, is a primary out-of-plane bending vibration mode in which two nodes appear in parallel in the X-direction, which is a longitudinal direction of the vibrator 2. Since the two protruding portions 3a are each disposed at a position where vibration amplitude in the Z-direction in the mode A reaches a maximum, that is, an antinode position, a vibration in the mode A displaces the two protruding portions 3a in the Z-direction, which is the pressure direction. A mode B, which is a second vibration mode, is a secondary out-of-plane bending vibration mode in which three nodes appear in approximately parallel in the Y-direction, which is a shorthand direction of the vibrator 2. Since the two protruding portions 3a are each disposed at a position where vibration amplitude in the Z-direction in the mode B reaches a minimum, that is, a node position, a vibration in the mode B displaces the two protruding portions 3a in the X-direction.

With combination of the vibrations in the modes A and B, the two protruding portions 3a generate a vibration of elliptic motion or circular motion (vibration in a mode C) within a Z-X plane. Bringing the slider 9 into pressure contact with the two protruding portions 3a generates friction force in the X-direction, and generates driving force (thrust force) that relatively moves the vibrator 2 and the slider 9. Since the vibrator 2 is held in a method, which will be described below, the slider 9 is driven in the X-direction.

To efficiently drive the vibration wave motor 1, it is necessary to apply pressure to the vibrator 2 without inhibiting vibrations (displacement) that are excited in the vibrator 2 in the two vibration modes. To achieve this, it is desirable to support the neighborhood of nodes in the two vibration modes. For this reason, the pressure member 6 is provided with two raised portions 6a to apply pressure to and hold the nodes that are common to the two vibration modes, to apply pressure efficiently to the vibrator 2.

Furthermore, the raised portions 6a also serve as portions for holding the vibrator 2 in the X-direction and the Y-direction. In the present exemplary embodiment, among the vibrator 2, the flexible print substrate 5 and the raised portions 6a contact with each other, and force of pressure and a friction coefficient are adjusted such that a value of maximum static frictional force between the flexible print substrate 5 and the raised portions 6a is always larger than a value of thrust force generated in the slider 9. That is, the vibrator 2 does not move with respect to the pressure member 6 during driving of the vibration wave motor 1.

Meanwhile, the pressure member 6 is provided with four loose-fit portions 6b, which support the outer circumferential surface of the vibrator 2 with a play (are loosely fit to the outer circumferential surface). These loose-fit portions 6b each function as a positioning portion at the time of assembly of the vibrator 2 and function as a stopper when some kind of external force acts on the slider 9.

There is a possibility that the loose-fit portions 6b are in contact with two positions that are different from nodes of the vibration of the outer circumferential surface of the vibrator 2. However, as described above, the maximum static frictional force between the flexible print substrate 5 and the raised portions 6a is greater than the thrust force generated in the slider 9. Hence, force in the X-direction and the Y-direction does not act on a contact portion between the loose-fit portions 6b and the vibrator 2. Thus, a loss caused herein is negligible, and an issue in terms of driving does not occur.

Since the raised portions 6a of the pressure member 6 and the neighborhood of nodes of the vibrator 2 are in direct contact with each other and the loose-fit portions 6b and the outer circumferential surface of the vibrator 2 are in direct contact with each other, a material of the pressure member 6 is desirably a resin having high vibration isolation properties to prevent occurrence of noise. It is desirable that the raised portions 6a has a high friction coefficient, to increase holding force of the vibrator 2 for the above-mentioned reasons. At the same time, it is desirable that the loose-fit portions 6b has a low friction coefficient, to further reduce a frictional loss between the loose-fit portions 6b and the vibrator 2. For this reason, it is possible to apply a coating for increasing the friction coefficient to the raised portions 6a, and on the contrary, apply a coating for decreasing the friction coefficient to the loose-fit portions 6b. Alternatively, different components having respectively appropriate friction coefficients can be added by adhesive bonding or press-fitting.

Figure 4A:
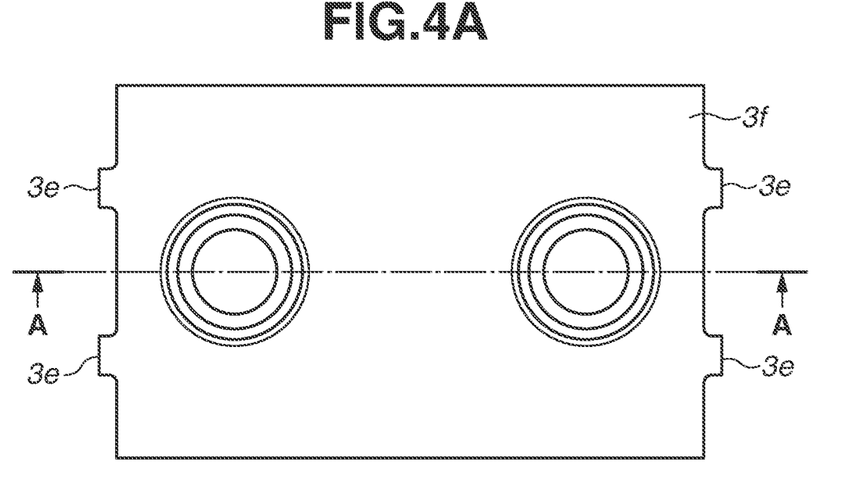
FIG. 4A is a top view of a vibrator according to the first exemplary embodiment of the present disclosure.
Figure 4B:
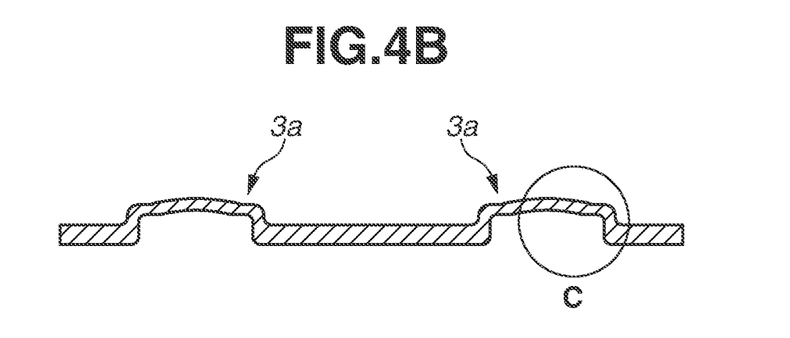
FIG. 4B is a sectional view of the vibrator according to the first exemplary embodiment of the present invention disclosure.
Figure 4C:
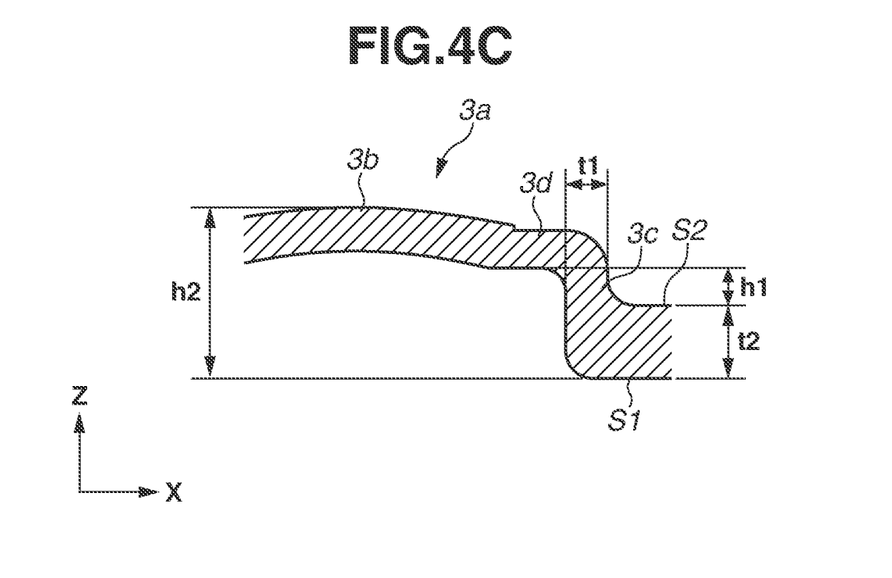
FIG. 4C is an enlarged sectional view of the vibrator according to the first exemplary embodiment of the present disclosure.

Subsequently, the elastic body 3 is described with reference to FIGS. 4A to 4C. FIG. 4A is a top view of the elastic body 3. FIG. 4B is a sectional view (A-A sectional view) along an A-A line in FIG. 4A. FIG. 4C is an enlarged view of a portion C in FIG. 4B. The elastic body 3 is desirably made of a material with lower attenuation in vibration, such as a metal and ceramics. An especially desirable material is martensite stainless steel, which is advantageous because it exhibits especially low attenuation, and its hardness and abrasion resistance can be increased by quenching after being processed. As a quenching method, the whole of the elastic body 3 may be quenched by normal quenching, or only the leading ends of the protruding portions 3a can be quenched by laser quenching. Partially quenching the elastic body 3 in the above-described manner can reduce deformation of the elastic body 3, and realize a desirable bonding state between the elastic body 3 and the piezoelectric element 4. The desirable state mentioned herein is a state where an adhesive layer is thin and even.

As described above, the elastic body 3 is provided with the two protruding portions 3a, and furthermore, each of the two protruding portions 3a has a hollow structure including a side wall portion 3c having a cylindrical form, a contact portion 3b having a contact surface being in pressure contact with the slider 9, and a coupling portion 3d coupling the contact portion 3b and the side wall portion 3c. A step is formed on an upper surface of the coupling portion 3d such that the coupling portion 3d is lower than the contact portion 3b, whereby the slider 9 is prevented from coming in contact with the coupling portion 3d. Further, the coupling portion 3d is thinner than the contact portion 3b, which enables the protruding portion 3a to have a spring property (flexibility) in the pressure direction due to decrease in rigidity in the Z-direction (pressure direction). This spring property leads to smooth contact between the vibrator 2 and the slider 9, whereby occurrence of noise can be prevented. The elastic body 3 is further provided with four pieces of projections 3e. The projections 3e loosely fit to the loose-fit portions 6b to serve as portions for positioning the vibrator 2.

Regarding manufacturing of the elastic body 3, the protruding portions 3a can be integrally formed with the elastic body 3 by pressing, cutting, or the like, or can be manufactured separately and then fixed to the elastic body 3 by welding, adhesive bonding, or the like. A plurality of protruding portions 3a can be disposed like the present exemplary embodiment, or one protruding portion 3a can be disposed. Among various methods, a method of forming the protruding portions 3a by drawing from a sheet metal is the most desirable in terms of cost and shape stability. Dimensions of the protruding portion 3a is defined as follows. A thickness t1 of the side wall portion 3c is defined as a thickness of the side wall portion 3c in a direction orthogonal to the Z-direction (pressure direction), or a difference between an inner diameter of the side wall portion 3c and an outer diameter of the side wall portion 3c. A height h1 of the side wall portion 3c is defined as a distance in the Z-direction (pressure direction) from a second surface S2 of a flat plate portion 3f to the coupling portion 3d. The second surface S2 faces a first surface S1 of the flat plate portion 3f, and the piezoelectric element 4 is fixed to the first surface S1. A thickness t2 of the flat plate portion 3f is defined as a thickness of the flat plate portion 3f in the pressure direction. A height h2 of the protruding portion 3a is defined as a distance in the Z-direction (pressure direction) from the second surface S2 of the flat plate portion 3f to the coupling portion 3d. The second surface S2 faces the first surface S1 of the flat plate portion 3f, and the piezoelectric element 4 is fixed to the first surface S1.

Figure 5A:
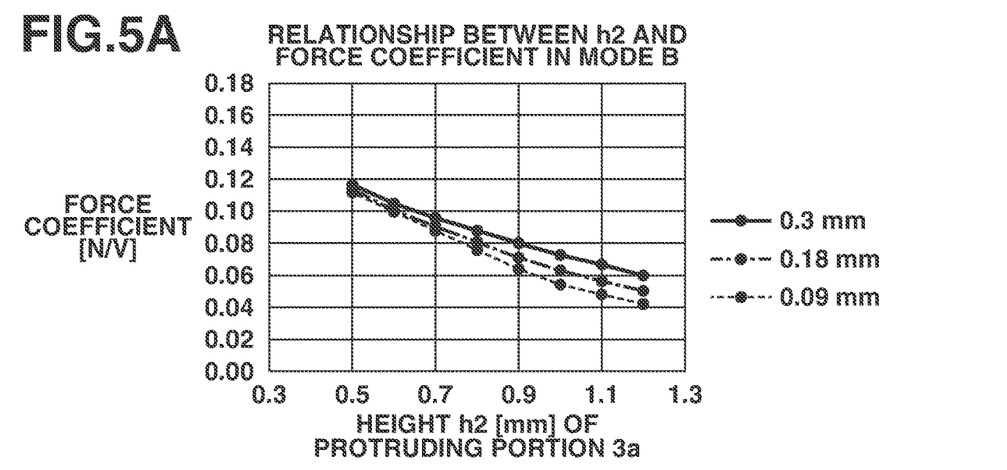
FIG. 5A is a graph indicating a relationship between a height of a protruding portion and a force coefficient in a mode B.

FIG. 5A is a graph indicating a relationship between the height h2 of the protruding portion 3a and a force coefficient in the mode B for three types of the thickness t1 (0.09, 0.18, and 0.30 mm) of the side wall portion 3c. The force coefficient mentioned herein is a force generated per unit applied voltage, and a unit is N/V. That is, in a case of an equal applied voltage, thrust force that can be generated by the vibrator 2 becomes greater as the force coefficient becomes higher. The force coefficient can be calculated by dividing a value Am, which is obtained by subtracting a current flowing in a capacity component from a current flowing in the piezoelectric element 4, by vibration velocity Va of the point of action on the contact body (vibration velocity at the leading end of the contact portion 3b in the present exemplary embodiment). That is, A=Am/Va where A represents the force coefficient. The force coefficient can be calculated for each vibration mode.

It is understood from FIG. 5A that the force coefficient in the mode B becomes higher as the height h2 of the protruding portion 3a becomes smaller. This is because the protruding portions 3a is disposed at the node position of a vibration in the mode B, as described above, whereby the principle of leverage acts more significantly as a distance from a neutral plane of a bending vibration in the mode B becomes smaller, and consequently, it becomes possible to generate larger force.

Figure 5B:
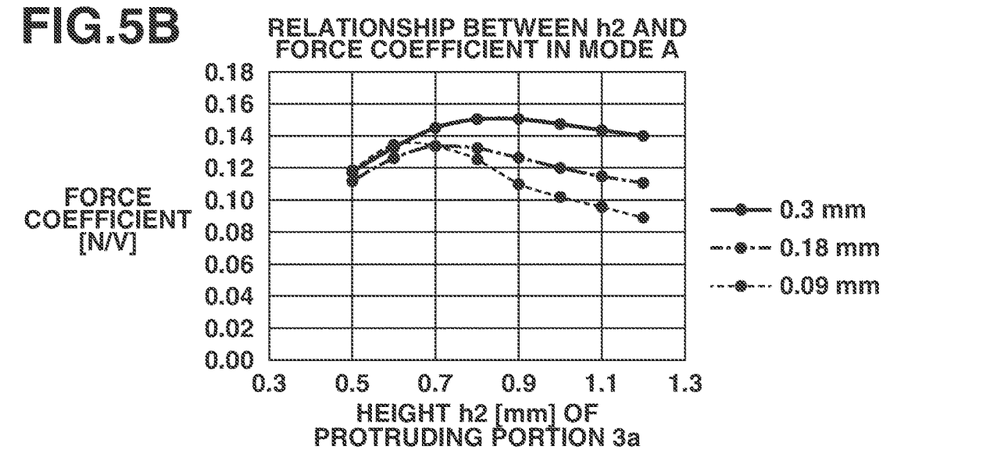
FIG. 5B is a graph indicating a relationship between the height of the protruding portion and a force coefficient in a mode A.
Figure 5C:
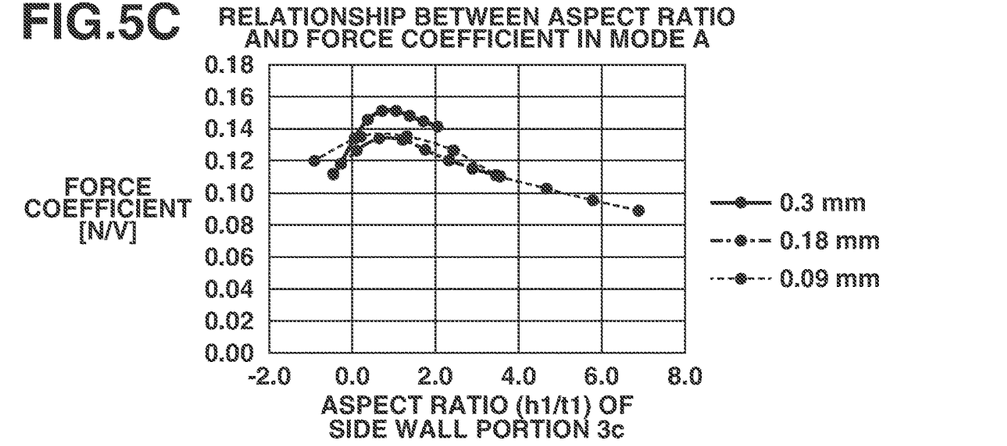
FIG. 5C is a graph indicating a relationship between an aspect ratio (=h1/t1) of a side wall portion and the force coefficient in the mode A.

FIG. 5B illustrates a graph indicating a relationship between the height h2 of the protruding portion 3a and a force coefficient in the mode A for three types of the thickness t1 (0.09, 0.18, and 0.30 mm) of the side wall portion 3c. Differently from the mode B, a local maximum value of the force coefficient appears in the mode A, and furthermore, it is understood that the height h2 of the protruding portion 3a in which the local maximum value of the force coefficient appears is different depending on the values of the thickness t1 of the side wall portion 3c. Consideration is now given to the reasons for the difference with reference to FIG. 5C indicating a relationship between an aspect ratio (h1/t1) of the side wall portion 3c and the force coefficient in the mode A. The aspect ratio is a value obtained by dividing the height h1 of the side wall portion 3c by the thickness t1 of the side wall portion 3c. The aspect ratio of a negative value means that a bottom surface of the coupling portion 3d is closer to the piezoelectric element 4 than a surface facing a bonding surface between the elastic body 3 and the piezoelectric element 4. In FIG. 5C, the aspect ratio is described as "h1/t1". It is found from the graph in FIG. 5C that even with any values of the thickness t1 of the side wall portion 3c, the force coefficient becomes a local maximum value when the aspect ratio of the side wall portion 3c is around 1. The reason for this is now described on a step-by-step basis. First, in the mode A, differently from the mode B, the protruding portion 3a is at a position of the antinode of the vibration in the mode A. Thus, the force coefficient does not change in accordance with the principle of leverage. However, the force coefficient is known to increase in proportion to bending rigidity, besides the above-mentioned elements. When the aspect ratio (h1/t1) is more than 1, the height of a protrusion is large, which results in decrease in rigidity of the protrusion itself, and consequently results in decrease in rigidity of the whole of the elastic body 3. In contrast, when the aspect ratio is less than 1, the effect of the thicknesses of the contact portion 3b and coupling portion 3d being less than the thickness of the elastic body 3 becomes larger, which leads to decrease in rigidity of the protrusion itself and also leads to decrease in rigidity of the whole of the elastic body 3.

As described above, the inventors have focused on the shape of the side wall portion 3c of the elastic body 3, and have succeeded in increasing the thrust force of the vibrator 2 based on a finding that setting the aspect ratio (h1/t1) of the side wall portion 3c to approximately 1 can increase the force coefficient. In terms of increasing the force coefficient in the mode A, the aspect ratio (h1/t1) is desirably more than zero and less than or equal to 2.0 (0<h1/t1≤2.0). Setting the aspect ratio within the range enables formation of the protruding portion 3a without formation of a recessed portion around the protruding portion 3a. In a conventional method as discussed in PTL 1, a thin-wall portion is formed around a protruding portion by crushing, and a reduced volume is used for the protruding portion to increase the height of the protrusion. Due to the crushing, shock lines are formed on the bonding surface of the elastic body with respect to the piezoelectric element. If the elastic body is bonded to the piezoelectric element without any processing, a portion in which the thickness of an adhesive layer is uneven and large is formed, which results in decrease in driving efficiency. To avoid the issue, lapping for flattening the bonding surface is essential. On the other hand, using the aspect ratio (h1/t1) within the above-mentioned range inevitably decreases the protruding portion 3a, and eliminates the need for forming the thin-wall portion by crushing. Consequently, the need for crushing can be eliminated. Furthermore, since flatness of the bonding surface becomes sufficient, a lapping process can be eliminated.

Furthermore, in terms of increasing the force coefficient in the mode B, the aspect ratio (h1/t1) is desirably more than or equal to 0.5 and less than or equal to 1.2 (0.5<h1/t1≤1.2) within a range that allows stable manufacturing. This is because, while it is desirable that the height h1 of the side wall portion 3c is formed smaller than the thickness t1 of the side wall portion 3c in terms of increasing the force coefficient in the mode B, setting the aspect ratio to h1/t1<0.5 causes an excessive volume at the time of execution of drawing, which prevents the contact portion 3b from having a desired spring constant. This is also because, if the aspect ratio is set to 1.2<h1/t1, cracking easily occurs at the time of execution of drawing.

In terms of increasing the force coefficient in the mode B, a ratio of the height h2 of the protrusion and the thickness t2 of the flat plate portion 3f (h2/t2) is desirably less than or equal to 3.0 (h2/t2≤3.0). This is necessary to eliminate formation of the recessed portion around the protruding portion 3a, as described above.

The thickness t2 of the flat plate portion 3f is described. When the thickness t2 is large, a resonance frequency becomes higher, and cost of a driving circuit that supports the higher resonance frequency increases. When the thickness t2 is small, on the other hand, the neutral plane of bending enters the piezoelectric element 4, whereby driving efficiency decreases. Thus, the thickness t2 is desirably more than or equal to 0.05 mm and less than or equal to 1.0 mm (0.05 mm≤t2≤1.0 mm).

The thickness t1 of the side wall portion 3c is described. In a case where the protruding portion 3a is formed by drawing, the protruding portion 3a protrudes by forming the thickness t1 smaller than the thickness t2. However, when the thickness t1 is too smaller than t2, cracking occurs easily as described above. Thus, the thickness t1 is desirably more than or equal to 0.03 mm and less than or equal to 0.7 mm (0.03 mm≤t1≤0.7 mm).

When the ratio between the thickness t1 of the side wall portion 3c and the thickness t2 of the flat plate portion 3f (t1/t2) is too low, cracking easily occurs. When the ratio is too high, a volume for forming the protruding portion 3a becomes insufficient. Thus, t1/t2 is desirably higher than or equal to 0.4 and lower than or equal to 0.8 (0.4≤t1/t2≤0.8).

Due to the increased force coefficient in the mode A and the mode B, vibration amplitude decreases. However, since the vibrator 2 is supported by the pressure member 6 without decreasing the driving efficiency as described above, it is possible to achieve vibration amplitude that is equivalent to that of the conventional configuration (aspect ratio of 3.4) as discussed in PTL 1, in other words, it is possible to achieve moving velocity of the contact body.

As described above, according to the present exemplary embodiment, as a first effect, the vibration wave motor capable of generating large thrust force with an applied voltage equivalent to that of the conventional configuration can be provided, which is a primary effect.

In addition, as a second effect, downsizing of the vibration wave motor 1 can be realized, which is a secondary effect. When the aspect ratio is close to 1, the height of the protruding portion 3a inevitably becomes small, and the thickness of the vibrator 2 can be made small.

As a third effect, as described above, the recessed portion is not formed around the protruding portion 3a, whereby the lapping process can be eliminated.

Figure 6:
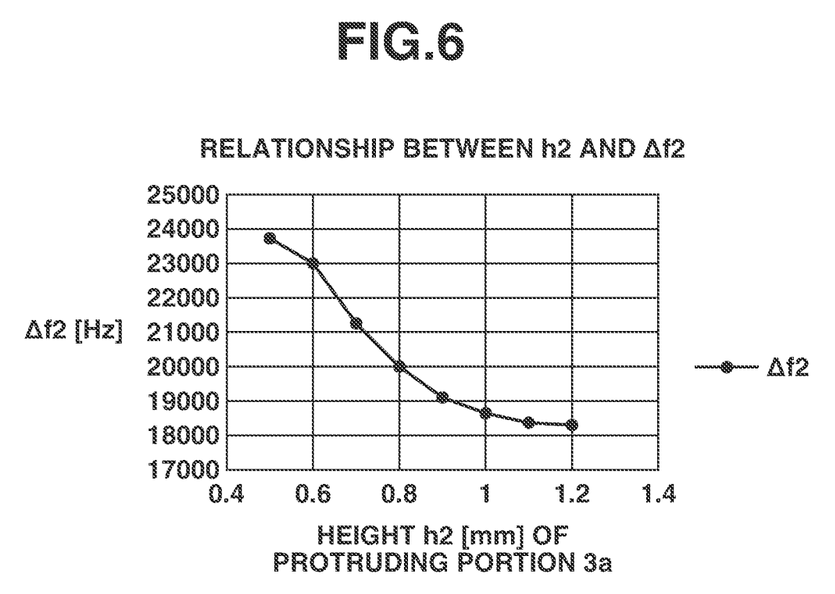
FIG. 6 is a graph indicating a relationship between the height of the protruding portion and Δf2.

As a fourth effect, unnecessary vibration can be decreased. The mode C illustrated in FIG. 3 is an unnecessary mode exhibiting a resonance frequency higher than that in the mode A and that in the mode B. When the resonance frequency in the mode C is close to a driving frequency, noise caused by matching of the driving frequency and the resonance frequency in the mode C occurs and power consumption increases. For this reason, a design to increase a difference Δf2 between the resonance frequency in the mode A and the resonance frequency in the mode C is necessary. While various methods, such as changing of the thickness of the piezoelectric element 4 and changing the shape of the elastic body 3 have been proposed, decreasing the height h2 of the protruding portion 3a can increase Δf2 according to the present exemplary embodiment, as illustrated in FIG. 6. This is because, in addition to the change in rigidity caused by the change in the protrusion, which has been described above, large distortion occurs in the neighborhood of the protruding portion 3a in the mode C, and thus only the resonance frequency in the mode C specifically increases.

In the linear-type vibration wave motor according to the present invention, a method of generating elliptic motion or circular motion on the contact surface is not limited to the method described above. For example, vibrations in different bending vibration modes different from the above-mentioned modes can be combined, or a vibration in a vertical vibration mode in which the elastic body 3 is expanded and contracted in a longitudinal direction and a vibration in the bending vibration mode can be combined. The present invention is not limited to the linear-type vibration wave motor, and can be applied to, for example, a rotary-type vibration wave motor by arranging the vibrator 2 in the circumference of a ring-type contact body.

Figure 7A:
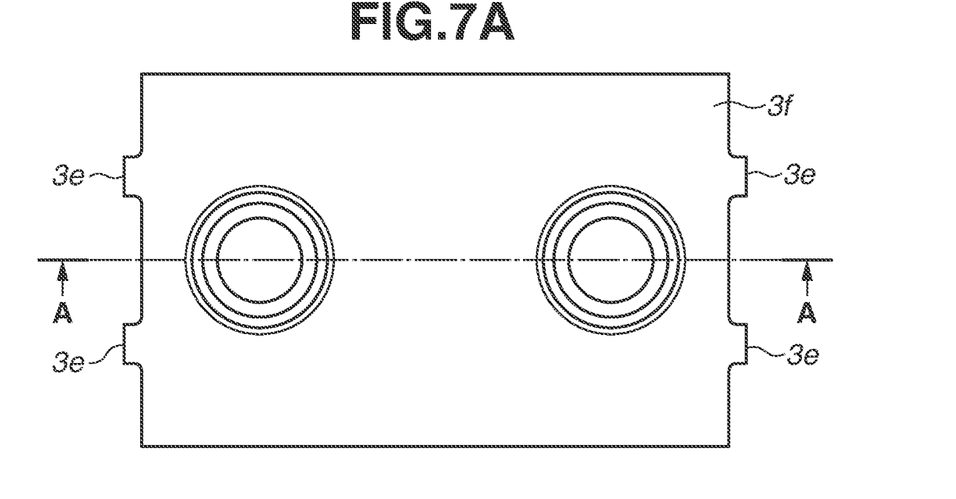
FIG. 7A is a top view of a vibrator according to a second exemplary embodiment of the present disclosure.
Figure 7B:
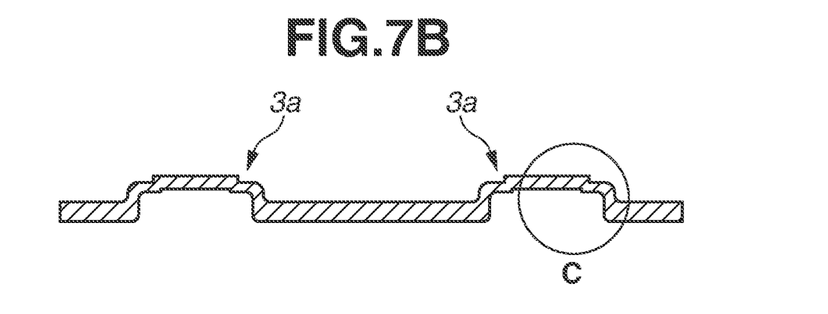
FIG. 7B is a sectional view of the vibrator according to the second exemplary embodiment of the present invention disclosure.
Figure 7C:
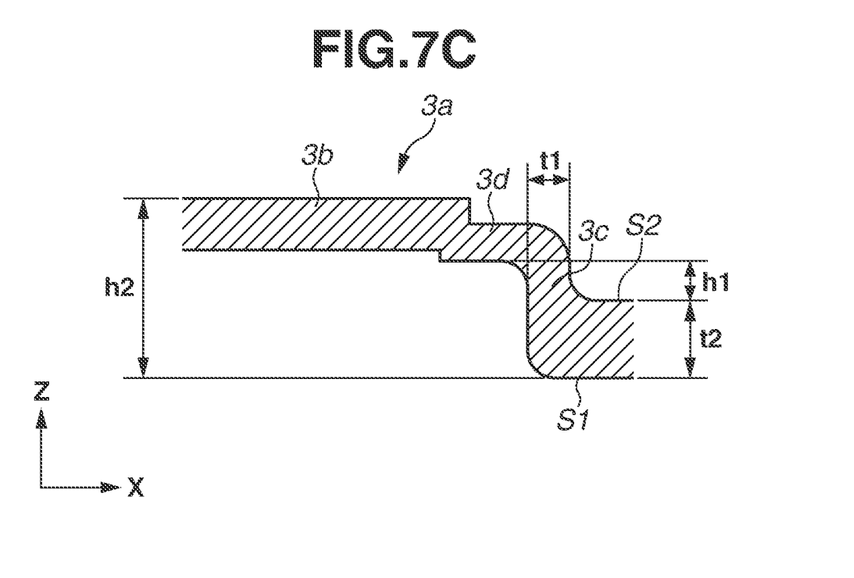
FIG. 7C is an enlarged sectional view of the vibrator according to the second exemplary embodiment of the present disclosure.

FIGS. 7A to 7C are diagrams each illustrating the elastic body 3 according to a second exemplary embodiment. FIG. 7A is a top view of the elastic body 3. FIG. 7B is a sectional view (A-A sectional view) along an A-A line in FIG. 7A. FIG. 7C is an enlarged view of a portion C in FIG. 7B. Since the second exemplary embodiment is different from the first exemplary embodiment only in a configuration of the protruding portion 3a and the other components are identical, and thus the redundant description of the other components is omitted.

As illustrated in FIG. 7C, a contact surface between the contact portion 3b and the slider 9 has a flat shape which is different from the first exemplary embodiment. In a case of the flat shape, the contact surface needs to be subjected to lapping processing or the like after being pressed, to bring the whole surface into contact with the slider 9 in a stable manner to increase flatness. However, in this configuration, because contact pressure is constant from an initial state, the flat shape is more advantageous than a curved surface shape, in terms of abrasion resistance.

Figure 8A:
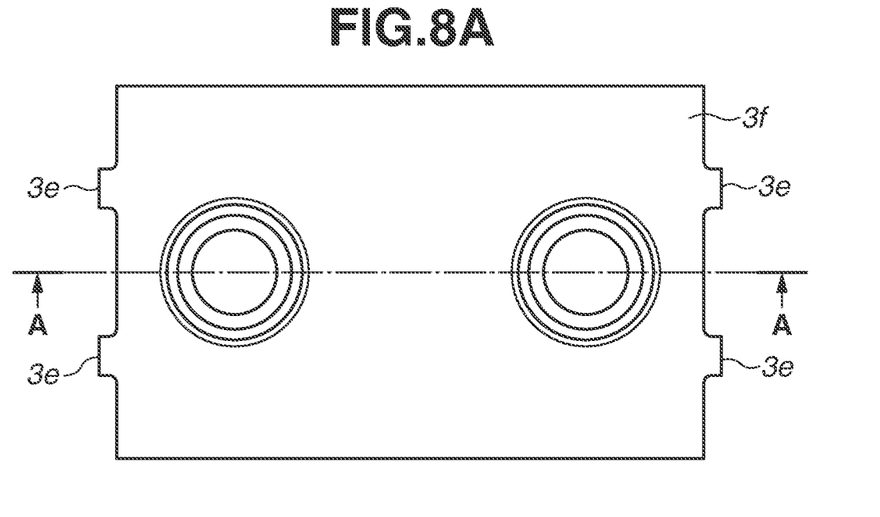
FIG. 8A is a top view of a vibrator according to a third exemplary embodiment of the present disclosure.
Figure 8B:
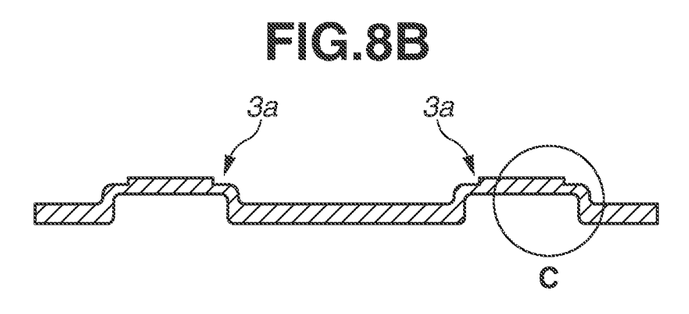
FIG. 8B is a sectional view of the vibrator according to the third exemplary embodiment of the present invention disclosure.
Figure 8C:
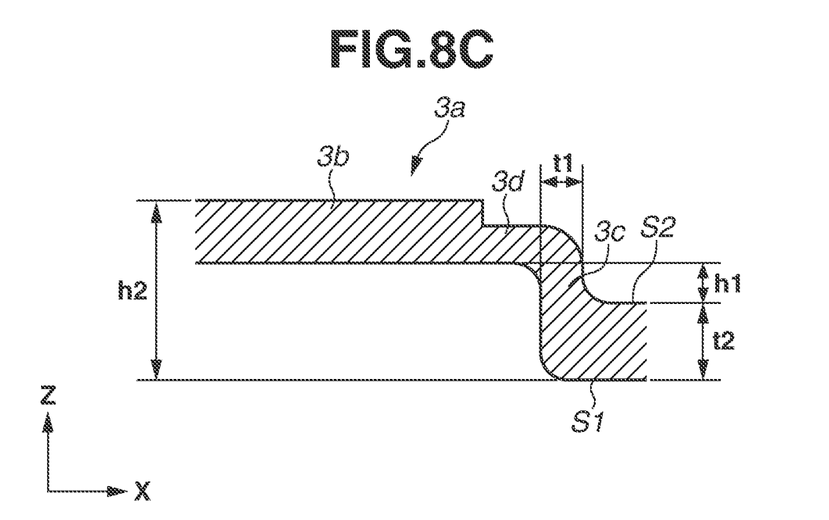
FIG. 8C is an enlarged sectional view of the vibrator according to the third exemplary embodiment of the present disclosure.

FIGS. 8A to 8C are diagrams each illustrating the elastic body 3 according to a third exemplary embodiment. FIG. 8A is a top view of the elastic body 3. FIG. 8B is a sectional view (A-A sectional view) along an A-A line in FIG. 8A. FIG. 8C is an enlarged view of a portion C in FIG. 8B. Since the third exemplary embodiment is different from the first exemplary embodiment only in a configuration of the protruding portion 3a and the other components are identical, the redundant description of the other components is omitted.

As illustrated in FIG. 8C, a bottom surface of the contact portion 3b and a bottom surface of the coupling portion 3d are flush with each other. Such a configuration can increase a volume of part that can be abraded in the contact portion 3b, and contributes to an increase in life of the vibration wave motor 1.

Figure 9A:
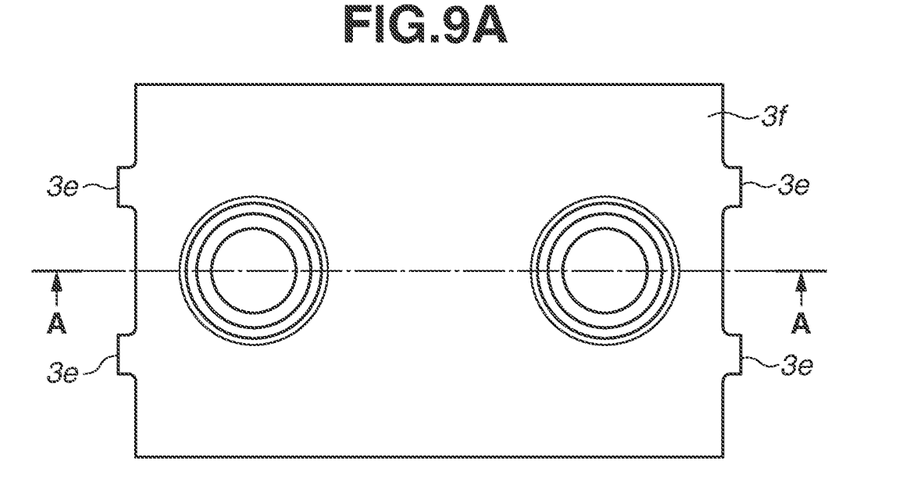
FIG. 9A is a top view of a vibrator according to a fourth exemplary embodiment of the present disclosure.
Figure 9B:
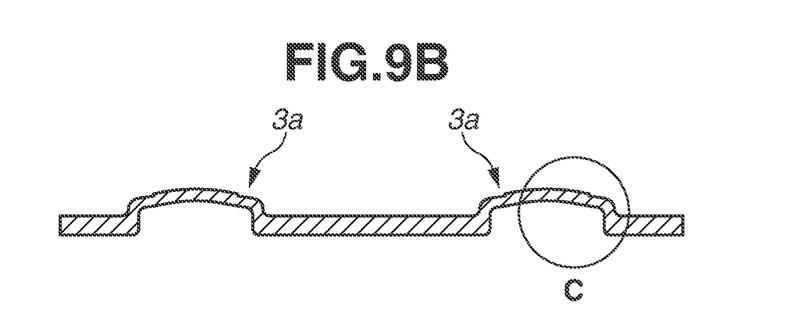
FIG. 9B is a sectional view of the vibrator according to the fourth exemplary embodiment of the present invention disclosure.
Figure 9C:
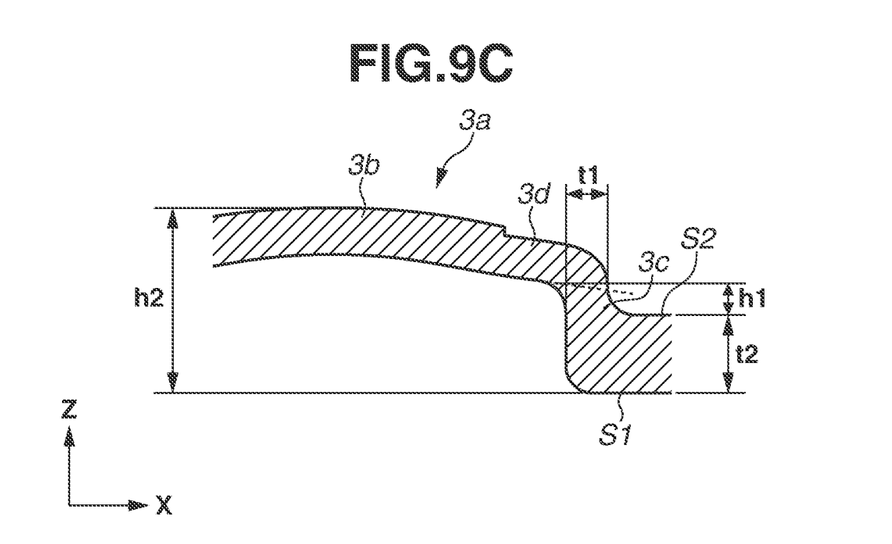
FIG. 9C is an enlarged sectional view of the vibrator according to the fourth exemplary embodiment of the present disclosure.

FIGS. 9A to 9C are diagrams each illustrating the elastic body 3 according to a fourth exemplary embodiment. FIG. 9A is a top view of the elastic body 3. FIG. 9B is a sectional view (A-A sectional view) along an A-A line in FIG. 9A. FIG. 9C is an enlarged view of a portion C in FIG. 9B. Since the fourth exemplary embodiment is different from the first exemplary embodiment only in a configuration of the protruding portion 3a and the other components are identical, the redundant description of the other components is omitted.

As illustrated in FIG. 9C, a bottom surface of the coupling portion 3d is not parallel to the X-direction. In this case, the height h1 of the side wall portion 3c is defined as a distance in the Z-direction from the second surface S2 of the flat plate portion 3f to an intersection point between an extension line (broken line in FIG. 9C) of the bottom surface of the coupling portion 3d and an extension line of an inner diameter of the side wall portion 3c. The second surface S2 faces the first surface S1 of the flat plate portion 3f, and the piezoelectric element 4 is fixed to the first surface S1. In a case where the bottom surface of the coupling portion 3d is a curved surface, a distance between an extension line of the curved surface excluding a corner R formed in processing and a surface of the elastic body 3 facing the bonding surface of the elastic body 3 to the piezoelectric element 4 is h1.

As the vibration wave motor according to the present invention, a driven member is not limited to a lens, such as a second lens group 320 and a fourth lens group 340. For example, in a fifth exemplary embodiment, an image pickup element, such as an image pickup element 710, can also be driven as the driven member.

Figure 10:
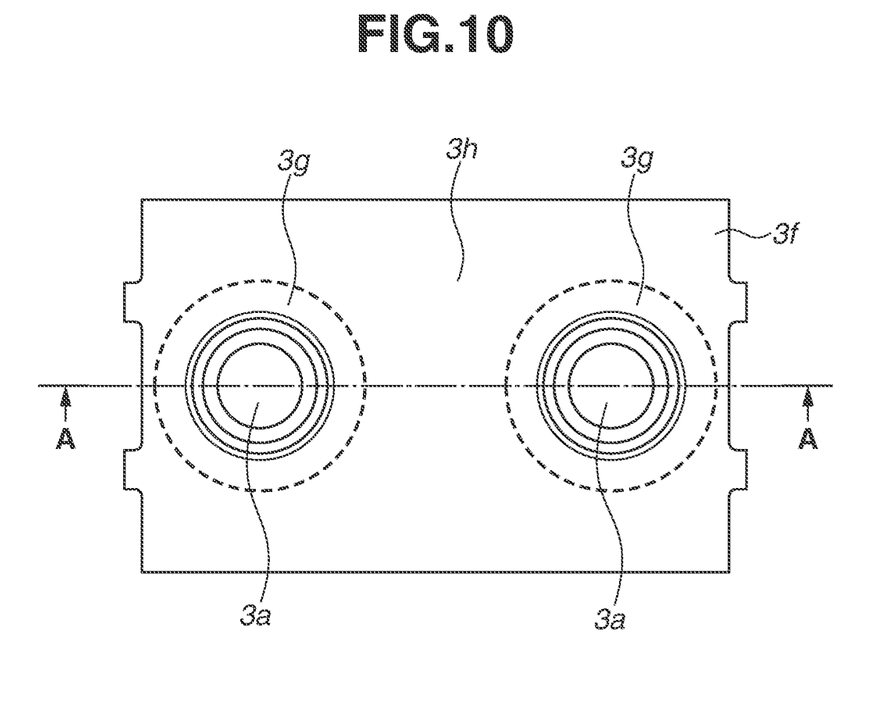
FIG. 10 is a top view of a vibrator according to a fifth exemplary embodiment of the present disclosure.

FIG. 10 is a top view of the elastic body 3 according to the first to fourth exemplary embodiments.

As illustrated in FIG. 10, each part is defined as follows: in the flat plate portion 3f, a region that surrounds the protruding portion 3a and that is adjacent to the protruding portion 3a is a first region 3g, a region that surrounds the first region 3g and that is adjacent to the first region 3g is a second region 3h, a thickness in the Z-direction (pressure direction) in the first region 3g is a thickness t21, and a thickness in the Z-direction (pressure direction) in the second region 3h is a thickness t22. A volume of the elastic body 3 before formation of the protruding portion 3a is a volume v1, and a volume of the elastic body 3 after formation of the protruding portion 3a is a volume v2. With the above definitions, the following relational expressions are desirably satisfied in the first to fourth exemplary embodiments.

$$t21/t22 = 1$$

$$v1 = v2$$

The vibration wave motor can be used, for example, for driving a lens of an imaging apparatus (optical apparatus and electronic apparatus). In a sixth exemplary embodiment, a description will be given of an imaging apparatus using the vibration wave motor for driving a lens arranged in a lens barrel, as an example.

Figure 11A:
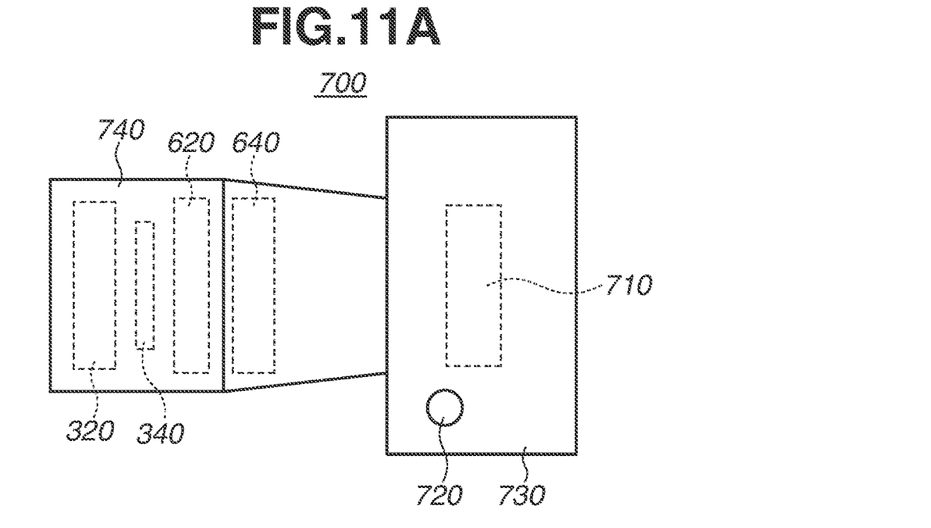
FIG. 11A is a top view illustrating a schematic configuration of an imaging apparatus (electronic apparatus) using a vibration wave motor according to a sixth exemplary embodiment of the present invention.

FIG. 11A is a top view illustrating a schematic configuration of an imaging apparatus 700. The imaging apparatus 700 is provided with a camera main body 730 including the image pickup element 710 and a power button 720. The imaging apparatus 700 is provided with a lens barrel 740 that includes a first lens group (not illustrated), the second lens group 320, a third lens group (not illustrated), the fourth lens group 340, and vibration-type driving devices 620 and 640 (vibration wave motors). The lens barrel 740 can be replaced as an interchangeable lens. The lens barrel 740 suitable for a subject to be imaged can be attached to the camera main body 730. In the imaging apparatus 700, the second lens group 320 (driven member) and the fourth lens group 340 (driven member) are driven by the vibration-type driving devices 620 and 640, respectively.

While a detailed configuration of the vibration-type driving device 620 is not illustrated, the vibration-type driving device 620 includes the vibration wave motor and a driving circuit for the vibration wave motor. The vibration-type driving device 620 moves the second lens group 320 along an optical axis of the imaging apparatus 700. The vibration-type driving device 640 moves the fourth lens group 340 along the optical axis.

Figure 11B:
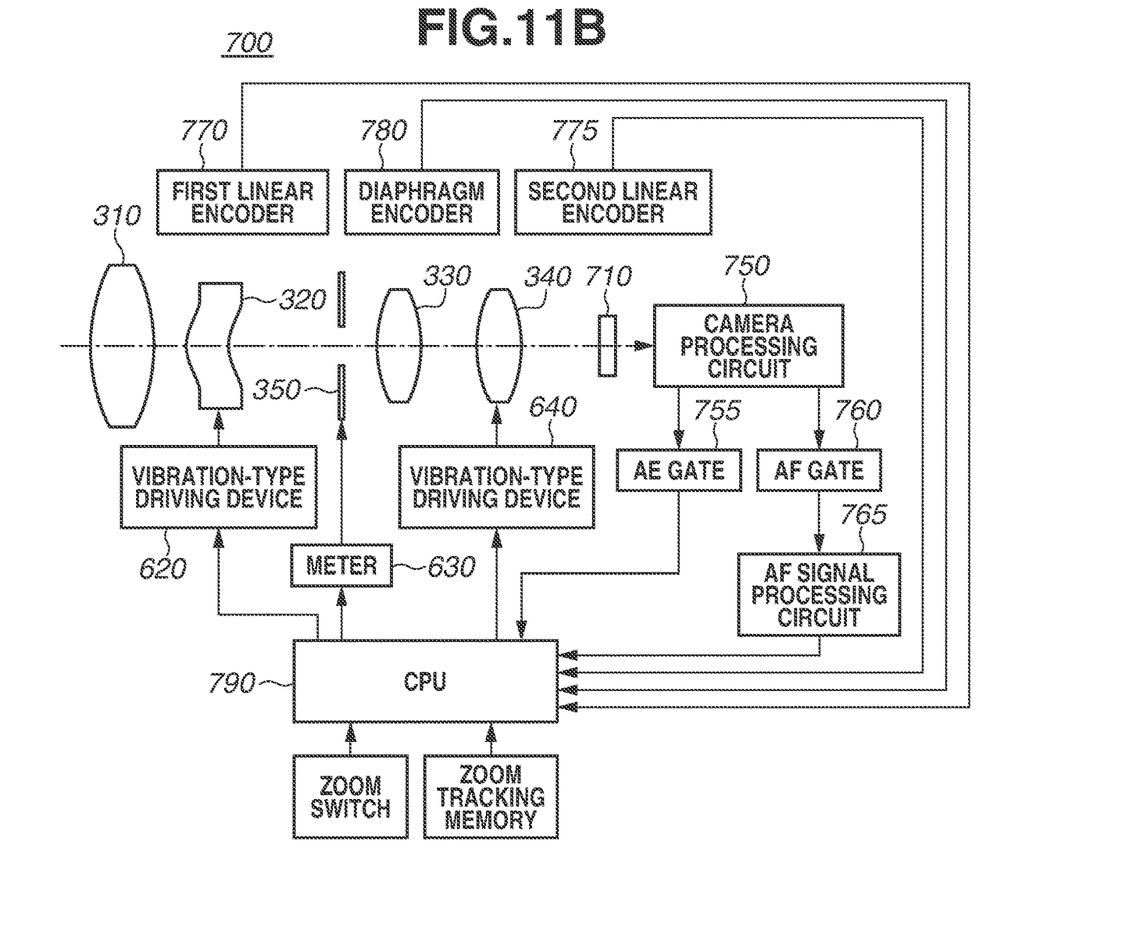
FIG. 11B is a block diagram illustrating a schematic configuration of the imaging apparatus (electronic apparatus) using the vibration wave motor according to the sixth exemplary embodiment of the present invention.

FIG. 11B is a block diagram illustrating a schematic configuration of the imaging apparatus 700. A first lens group 310, the second lens group 320, a third lens group 330, the fourth lens group 340, and a light amount adjustment unit 350 are arranged at respective predetermined positions on the optical axis inside the lens barrel 740. Light that has passed through the first lens group 310 to the fourth lens group 340 and the light amount adjustment unit 350 is formed as an image on the image pickup element 710. The image pickup element 710 converts an optical image to an electric signal, and outputs and transmits the electric signal to a camera processing circuit 750.

The camera processing circuit 750 performs amplification, gamma correction, or the like on the output signal from the image pickup element 710. The camera processing circuit 750 is connected to a central processing unit (CPU) 790 via an auto exposure (AE) gate 755, and is connected to the CPU 790 also via an auto focus (AF) gate 760 and an AF signal processing circuit 765. A video signal subjected to predetermined processing in the camera processing circuit 750 is transmitted to the CPU 790 via the AE gate 755, the AF gate 760, and the AF signal processing circuit 765. The AF signal processing circuit 765 extracts a high frequency component of the video signal, generates a signal of an evaluation value for auto focus, and supplies the generated evaluation value to the CPU 790.

The CPU 790 is a control circuit that controls the overall operation of the imaging apparatus 700, and generates a control signals for determining exposure and focusing from the acquired video signal. The CPU 790 controls driving of the vibration-type driving devices 620 and 640 and a meter 630 to adjust respective positions in the optical axis direction of the second lens group 320, the fourth lens group 340, and the light amount adjustment unit 350, to obtain a determined exposure and focus state. Under control of the CPU 790, the vibration-type driving device 620 moves the second lens group 320 in the optical axis direction, the vibration-type driving device 640 moves the fourth lens group 340 in the optical axis direction, and the light amount adjustment unit 350 is subjected to drive control by the meter 630.

The position in the optical axis direction of the second lens group 320 driven by the vibration-type driving device 620 is detected by a first linear encoder 770, and a result of the detection is notified to the CPU 790 and is thus fed back to driving of the vibration-type driving device 620. Similarly, the position in the optical axis direction of the fourth lens group 340 driven by the vibration-type driving device 640 is detected by a second linear encoder 775, and a result of the detection is notified to the CPU 790 and is thus fed back to driving of the vibration-type driving device 640. The position in the optical axis direction of the light amount adjustment unit 350 is detected by a diaphragm encoder 780, and a result of the detection is notified to the CPU 790 and is thus fed back to driving of the meter 630.

The present invention is not limited to the above-mentioned exemplary embodiments, and can be changed and modified in various manners without departing from the spirit and range of the present invention. Thus, the claims are attached hereto to publicize the range of the present invention.

The present disclosure enables provision of a vibration wave motor capable of increasing thrust force while preventing or reducing increase in applied voltage, and an electronic apparatus including the vibration wave motor.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A vibration wave motor, comprising:
   a vibrator including an electro-mechanical energy conversion element and an elastic body to which the electro-mechanical energy conversion element is fixed; and
   a contact body configured to be in pressure contact with the elastic body,
   wherein the vibration wave motor is configured to relatively move the vibrator and the contact body using a vibration excited in the vibrator,
   wherein the elastic body includes:
      a flat plate portion on which the electro-mechanical energy conversion element is fixed; and
      a protruding portion that protrudes from the flat plate portion,
   wherein the protruding portion includes:
      a contact portion that has a contact surface being in pressure contact with the contact body;
      a side wall portion that protrudes in a pressure direction and forms a hollow structure, the pressure direction representing a direction in which the contact surface is in pressure contact with the contact body; and
      a coupling portion that is configured to couple the contact portion and the side wall portion and has flexibility in the pressure direction, and
   wherein the following inequality is satisfied:

$$0 < h1/t1 \leq 2.0,$$

where a thickness of the side wall portion in a direction orthogonal to the pressure direction is t1, and a distance in the pressure direction from a second surface of the flat plate portion to the coupling portion is h1, the second surface of the flat plate portion facing a first surface of the flat plate portion on which the electro-mechanical energy conversion element is fixed.

2. The vibration wave motor according to claim 1, wherein the following inequality is satisfied:

$$h2/t2 \leq 3.0,$$

where a thickness of the flat plate portion in the pressure direction is t2, and a distance from the first surface to the contact surface in the pressure direction is h2.

3. The vibration wave motor according to claim 1, wherein the following inequality is satisfied:

$$0.4 \leq t1/t2 \leq 0.8.$$

4. The vibration wave motor according to claim 3, wherein the following inequalities are satisfied:

$$0.03 \text{ mm} \leq t1 \leq 0.7 \text{ mm, and}$$

$$0.05 \text{ mm} \leq t2 \leq 1.0 \text{ mm}.$$

5. The vibration wave motor according to claim 1, wherein the vibration excited in the vibrator is elliptic motion generated in the vibrator by combination of a plurality of standing waves that is excited by application of a plurality of alternating voltages having mutually different phases to the electro-mechanical energy conversion element.

6. The vibration wave motor according to claim 1, wherein the protruding portion is formed by pressing.

7. The vibration wave motor according to claim 1, wherein the following inequality is satisfied:

$$0.5 \leq h1/t1 \leq 1.2.$$

8. The vibration wave motor according to claim 1, wherein the following relational expressions are satisfied:

$$t21/t22 = 1$$

$$v1 = v2,$$

and
   where a thickness of the flat plate portion in the pressure direction in a first region that surrounds the protruding portion and is adjacent to the protruding portion is t21, a thickness of the flat plate portion in the pressure direction in a second region that surrounds the first region and that is adjacent to the first region is t22, a volume of the elastic body before formation of the protruding portion is v1, and a volume of the elastic body after formation of the protruding portion is v2.

9. An imaging apparatus, comprising:
   the vibration wave motor according to claim 1; and
   a lens configured to be driven by the vibration wave motor.

10. An imaging apparatus, comprising:
    the vibration wave motor according to claim 1; and
    an image pickup element configured to be driven by the vibration wave motor.

11. An electronic apparatus, comprising:
    the vibration wave motor according to claim 1; and
    a driven member configured to be driven by the vibration wave motor.

* * * * *